United States Patent
Sala et al.

(10) Patent No.: US 8,511,221 B2
(45) Date of Patent: *Aug. 20, 2013

(54) APPARATUS FOR PREPARING AND DISPENSING A BEVERAGE, IN PARTICULAR A CHOCOLATE-BASED BEVERAGE IN A COFFEE MACHINE

(75) Inventors: Dario Sala, Binasco (IT); Andrea Coccia, Binasco (IT)

(73) Assignee: Gruppo Cimbali S.p.A., Binasco (IT)

( * ) Notice: Subject to any disclaimer, the term of this patent is extended or adjusted under 35 U.S.C. 154(b) by 474 days.

This patent is subject to a terminal disclaimer.

(21) Appl. No.: 12/612,913

(22) Filed: Nov. 5, 2009

(65) Prior Publication Data
US 2011/0104357 A1 May 5, 2011

(51) Int. Cl.
A47J 31/44 (2006.01)

(52) U.S. Cl.
USPC ......... 99/293; 99/279; 126/381.1; 126/382.1; 126/369; 126/369.1; 126/369.2; 126/369.3; 222/129.3; 222/129.4; 222/146.1; 222/146.2; 222/148

(58) Field of Classification Search
USPC ............... 99/279, 293; 126/381.1–382.1, 126/369–369.3; 222/148, 129.3, 129.4, 146.1, 222/146.2
See application file for complete search history.

(56) References Cited

U.S. PATENT DOCUMENTS

| | | | | |
|---|---|---|---|---|
| 4,825,758 A | * | 5/1989 | Snowball et al. | 99/282 |
| 5,197,373 A | * | 3/1993 | De Jong | 99/283 |
| 5,265,518 A | * | 11/1993 | Reese et al. | 99/280 |
| 5,408,918 A | * | 4/1995 | King et al. | 99/289 R |
| 5,473,972 A | * | 12/1995 | Rizzuto et al. | 99/290 |
| 5,549,036 A | * | 8/1996 | Hourizadeh | 99/286 |
| 5,551,331 A | * | 9/1996 | Pfeifer et al. | 99/280 |
| 5,769,135 A | * | 6/1998 | Mahlich | 141/70 |
| 5,806,407 A | * | 9/1998 | Neiman | 99/281 |
| 5,855,162 A | * | 1/1999 | Bauer et al. | 99/290 |
| 6,722,265 B2 | * | 4/2004 | Priley | 99/299 |
| 6,959,642 B1 | * | 11/2005 | Landolt | 99/455 |
| 7,021,206 B2 | * | 4/2006 | Eckenhausen et al. | 99/452 |
| 7,281,467 B2 | * | 10/2007 | Cai | 99/293 |
| 7,415,921 B2 | * | 8/2008 | Brouwer | 99/283 |
| 7,845,270 B2 | * | 12/2010 | Rahn et al. | 99/289 R |
| 7,922,382 B2 | * | 4/2011 | Thakur et al. | 366/137.1 |

(Continued)

FOREIGN PATENT DOCUMENTS

| | | |
|---|---|---|
| EP | 1 374 748 | 1/2004 |
| EP | 2 060 211 | 5/2009 |
| WO | WO 2006/135864 | 12/2006 |

OTHER PUBLICATIONS

European Search Report for EP 07425729.6 dated May 9, 2008.

*Primary Examiner* — Henry Yuen
*Assistant Examiner* — Brett Spurlock
(74) *Attorney, Agent, or Firm* — Nixon & Vanderhye, PC

(57) ABSTRACT

A machine for preparing coffee and milk based beverages having a steam generator, a first apparatus for producing coffee as well as a source of liquid milk and a second apparatus for preparing and dispensing a beverage from a concentrated fluid product. The second apparatus includes a beverage preparation device associated with a second dispenser connected via first line to a first connector unit of the second apparatus to receive a concentrated fluid product pre-diluted in the first connector unit and, via a second line, to the source of liquid milk to complete dilution and obtain a diluted product to be dispensed from the beverage preparation device.

9 Claims, 2 Drawing Sheets

(56) References Cited

U.S. PATENT DOCUMENTS

| | | | |
|---|---|---|---|
| 8,056,469 B2* | 11/2011 | Sala et al. | 99/290 |
| 2002/0130137 A1* | 9/2002 | Greenwald et al. | 222/54 |
| 2003/0232115 A1* | 12/2003 | Eckenhausen et al. | 426/477 |
| 2005/0095341 A1* | 5/2005 | Sher et al. | 426/594 |
| 2005/0238768 A1* | 10/2005 | Sher et al. | 426/115 |
| 2005/0279215 A1* | 12/2005 | Cai | 99/279 |
| 2006/0005712 A1* | 1/2006 | Greenwald et al. | 99/275 |
| 2006/0034987 A1* | 2/2006 | Thakur et al. | 426/477 |
| 2006/0196363 A1* | 9/2006 | Rahn | 99/279 |
| 2006/0286262 A1* | 12/2006 | Stearns et al. | 426/596 |
| 2007/0202227 A1* | 8/2007 | Thakur et al. | 426/477 |
| 2008/0206429 A1* | 8/2008 | Guerrero et al. | 426/590 |
| 2008/0236402 A1* | 10/2008 | Yang | 99/300 |
| 2009/0095163 A1* | 4/2009 | Sala et al. | 99/284 |

* cited by examiner

APPARATUS FOR PREPARING AND DISPENSING A BEVERAGE, IN PARTICULAR A CHOCOLATE-BASED BEVERAGE IN A COFFEE MACHINE

FIELD OF THE INVENTION

The present invention relates to a machine for preparing various types of coffee and milk based beverages comprising an apparatus for preparing and dispensing a beverage obtained from a concentrated fluid product having the taste of the beverage to be prepared, a milk source and an apparatus for producing coffee.

BACKGROUND OF THE INVENTION

Coffee machines suitable for preparing and dispensing various types of beverages are known in the specific technological sector.

In machines of the conventional type, the beverages are prepared with a certain amount of manual dexterity by the operator who, for example, heats and froths milk in a jug and then pours it into the cup and mixes it with the coffee in order to form cappuccino.

Modern technology and the massive use of electronics are also giving rise in this type of machine to an increasingly greater automation of the operations such that they may also be performed by operators who are less expert in the techniques for preparing the various beverages.

Apart from coffee, cappuccino and tea, a beverage which is becoming increasingly popular among consumers is hot chocolate which traditionally is prepared by mixing the chocolate-based product with milk and then heating the whole preparation using the conventional steam spout of a coffee machine.

Instead of conventional soluble products in powder form, chocolate-based fluid preparations in concentrated form, which need to be diluted, are becoming increasingly widespread.

These latter preparations, in fact, have the advantage that they may pass from a sterile container which contains them to the sealed distribution pipes inside the apparatus without any particular risk of contamination which could adversely affect the hygienic conditions of the beverage.

Inventors have observed that the use of concentrated fluid milk as a primary source for the various uses in coffee machines is becoming increasingly widespread and that a problem arises as to how to use the milk source during preparation of the chocolate when the latter is in turn obtained from a concentrated fluid product.

The direct mixing of a quantity of concentrated fluid milk with a corresponding quantity of concentrated chocolate-based product for preparation of the chocolate-based beverage is not easy to achieve and may produce results which are not satisfactory from a qualitative point of view.

SUMMARY OF THE INVENTION

An object of the present invention is to provide an apparatus and a method for preparing chocolate in a coffee machine, obtained from a concentrated fluid product, preferably chocolate-based, resulting in a significant structural simplification and standardization of the components used.

Another object of the present invention is to provide the possibility of obtaining from a coffee machine both hot and cold chocolate-based beverages in order to satisfy the requirements of users as regards to the variation of the beverages.

In an aspect, the present invention relates to a machine for preparing various types of coffee and milk based beverages comprising: a steam generator for producing steam; a first apparatus for producing coffee associated with a first dispenser; a source of liquid milk, and a second apparatus for preparing and dispensing a beverage from a concentrated fluid product having the taste of the beverage to be prepared, wherein said second apparatus includes a concentrated fluid product tank containing the concentrated fluid product to be used for the preparation of the beverage, a first connector unit connected to said tank by means of a concentrated fluid line, a first metering pump arranged along said concentrated fluid line so as to convey a predetermined quantity of concentrated fluid product from said tank to said first connector unit, a water heater device provided with a first inlet and an outlet for the water and a second inlet for introducing the steam, a first water supply line connecting the first inlet of the water heater device to a water source, a heated water line for connecting the outlet of the heater device with the first connector unit so as to introduce into the latter a predetermined quantity of heated water, a first steam line connecting the steam generator to the second inlet for supplying steam to the heater device, and a beverage preparation device associated with a second dispenser connected to the first connector unit and to the source of liquid milk by means of respective lines.

In another aspect, the present invention relates to a method for preparing a beverage obtained from a concentrated fluid product, comprising the steps of: providing a predetermined quantity of concentrated fluid product; diluting the predetermined quantity of concentrated fluid product with a predetermined quantity of heated water so as to obtain a first diluted fluid product having a degree of dilution which is less than a final dilution of the beverage when ready for consumption; conveying the first diluted fluid product into a beverage preparation device, and completing dilution of the first diluted fluid product by supplying a predetermined quantity of milk into said beverage preparation device so as to obtain a second diluted fluid product having the final dilution of the beverage when ready for consumption.

The present invention will be now described more fully hereinafter with reference to the accompanying drawings, in which some, but not all embodiments of the invention are shown. Drawings illustrating the embodiments are not-to-scale schematic representations.

DETAILED DESCRIPTION

Figure 1:
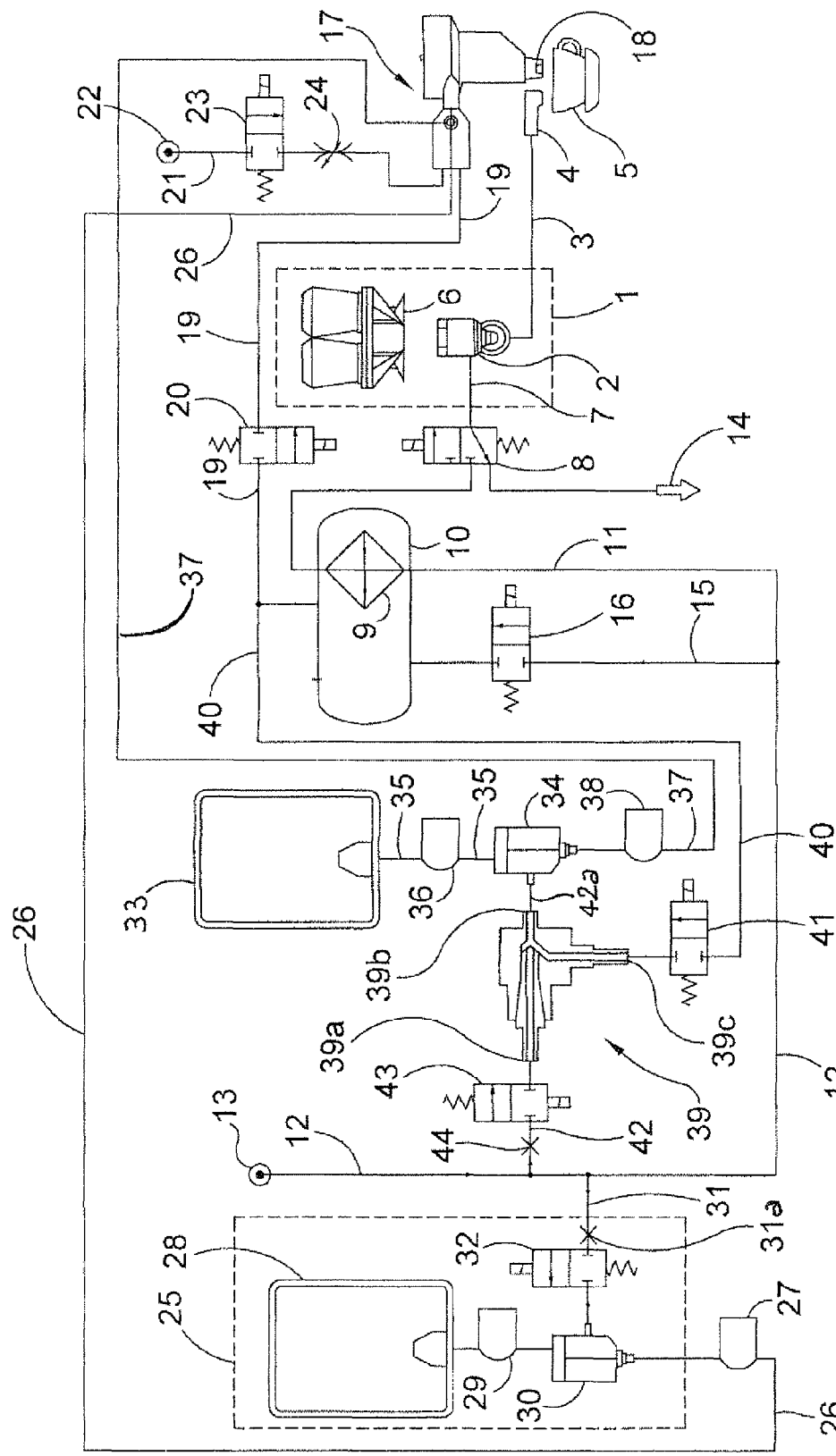
FIG. 1 shows in schematic form the circuit layout of the machine, according to an embodiment of the invention.

FIG. 1 illustrates a machine for preparing various types of coffee and milk based beverages which comprises an apparatus for producing coffee, which is denoted in its entirety with reference number 1, and in particular for producing espresso coffee, without this necessarily excluding a different type of coffee-based beverage. The apparatus 1 comprises a coffee extraction device 2 which is connected, by means of a line 3, to a conventional dispenser 4 underneath which a receiving cup, schematically denoted by 5, is positioned.

The characteristics of the coffee extraction device 2 depend on the preparation methods. For example, said device may be in the form of a simple mixer in the case of coffee which is soluble or in the form of a concentrated syrup.

Alternatively, the coffee extraction device may comprise a conventional device equipped with filter or functioning using pods or capsules.

The coffee producing apparatus 1 further comprises a container 6 of conventional type for dispensing soluble coffee or concentrated coffee syrup. In another embodiment, the apparatus comprise a device for grinding coffee beans supplying ground coffee to the coffee extraction device for preparation of traditional espresso coffee.

The extraction device 2 is connected by means of a line 7 to an intercept valve 8 which connects it to a hot water source which, in the example shown in FIG. 1, comprises a heat exchanger 9 which is situated inside a steam generator 10, the latter being configured to produce also steam. The heat exchanger 9 is connected, by means of a line 11 and a line 12, to a water source 13 for the necessary replenishing with water.

In the position where it intercepts the line 7, the intercept valve 8 connects the extraction device 2 to an outlet 14 for removal of any possible residual matter.

The steam generator 10 is also replenished with water from the water source 13 via a line 15 and an intercept valve 16.

Figure 2:
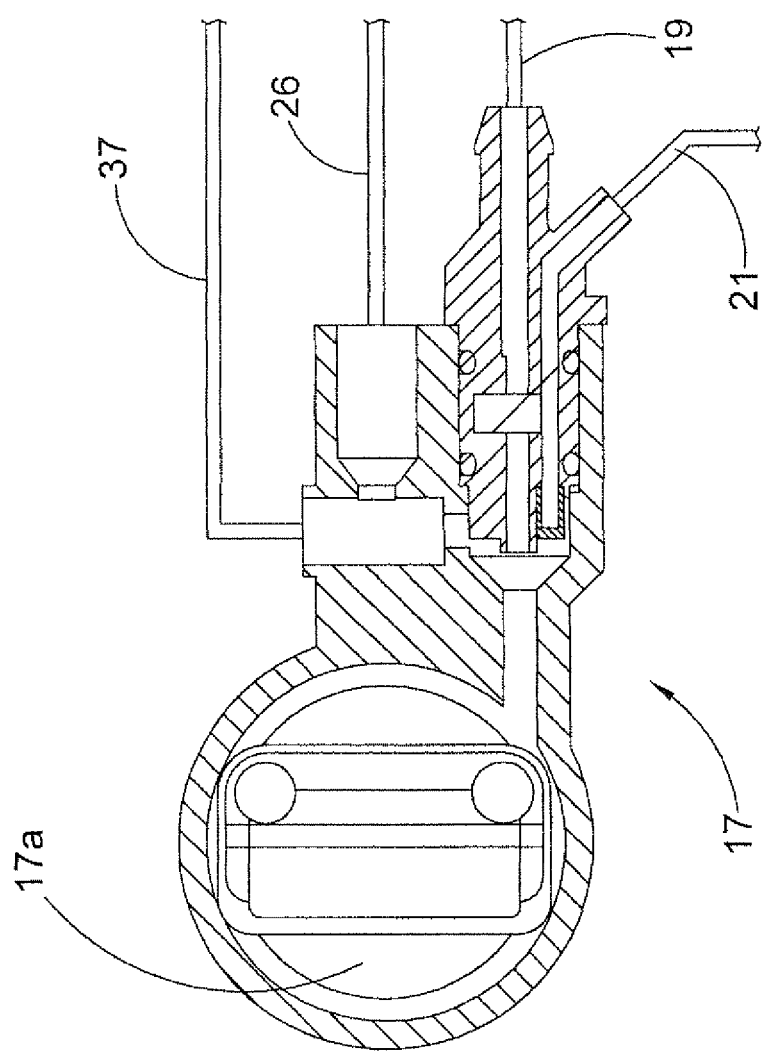
FIG. 2 shows, in a cross-sectional view and on a larger scale, the device of FIG. 1 for preparing the beverage with a frother and associated lines for supplying the liquid milk, steam, air and chocolate-based product with preliminary dilution thereof, according to an embodiment of the invention.

The machine for preparing coffee- and milk-based beverages includes a beverage preparation device 17. In an embodiment, shown more in detail in FIG. 2, the beverage preparation device includes a frothing chamber 17a with an associated dispensing spout 18 situated above the cup 5. Preferably, the beverage preparation device 17 is connected, by means of a steam line 19 and an intercept valve 20, to the steam generator 10. Preferably, by means of an air line 21, the device 17 is connected to an air source 22.

An intercept valve 23 and an adjustable flow restrictor 24, if required, are arranged along the air line 21.

The beverage preparation device 17 is connected to a source 25 of liquid milk by means of a milk line 26 along which a circulating pump 27 operated by a conventional electric motor, not shown, is arranged. The pump 27 may preferably be of the peristaltic type or gear type and the electric motor may be of the variable-speed type.

The source 25 of liquid milk comprises a milk tank 28 containing concentrated milk in the fluid state which is conveyed, by means of a metering pump 29, to a connector unit 30. The metering pump 29 delivers a dosed quantity of concentrated milk to the connector unit 30. In an embodiment, the connector unit is configured to contain internally a non-return valve (not shown in the drawings) suitable for preventing bacterial contamination of the product contained in the milk tank 28.

The water source 13 is connected to the connector unit 30 via a water supply line 31 provided with a flow restrictor 31a and intercepted by an intercept valve 32.

Mixing of a predetermined quantity of concentrated milk supplied by the metering pump 29 and water from the water source 13 is performed inside the connector unit 30, resulting in the formation of cold diluted milk.

The cold diluted milk is propelled by means of the circulating pump 27 through the milk line 26 to the beverage preparation device 17. In some embodiments, heating, when required, is performed in the beverage preparation device 17 by means of transfer of the condensation heat of the steam from the steam generator 10 via the steam line 19 and the intercept valve 20.

Frothing of the milk, when required, is performed in the frothing chamber 17a by means of the introduction of air via the air line 21 and the adjustable flow restrictor 24. In an embodiment, the air is under pressure.

If cold milk is desired or requested by the user, the steam valve 20 is kept closed so that no steam reaches the beverage preparation device 17.

The cold diluted milk may be dispensed in its liquid state or may be frothed, by supplying air to the beverage preparation device 17 by means of the air line 21.

In accordance with some preferred embodiments of the invention, the coffee machine comprises a concentrated fluid product tank 33 containing a chocolate-based fluid preparation in concentrated form.

The concentrated fluid product tank 33 is connected to a connector unit 34 by means of a first line 35 along which a metering pump 36 is arranged. The same connector unit 34 is connected, by means of a second line 37 comprising, where necessary, a circulating pump 38, to the beverage preparation device 17.

A quantity of concentrated chocolate product is drawn in by the tank 33 via the metering pump 36 which propels it into the connector unit 34. In an embodiment, the latter is provided with a conventional non-return valve for preventing contamination inside the tank 33.

In accordance with some preferred embodiments of the invention, a predetermined quantity of concentrated fluid product, for example of chocolate-based product, is supplied into the connector unit 34 where it undergoes a first stage of dilution with water heated to a predetermined temperature inside a steam heater device denoted overall by 39.

The steam heater device 39, which may be of conventional type, comprises a first inlet 39a for the water to be heated, an outlet 39b for the heated water and a second inlet 39c for introducing heating steam.

The second inlet 39c is connected to a steam line 40, which is connected to the steam generator 10, preferably with the provision of an intercept valve 41 arranged along the steam line 40.

The first inlet 39a of the heater is connected, by means of a water supply line 42, to the water source 13 via an intercept valve 43 and a calibrated flow restrictor 44.

The outlet 39b of the heater device 39, by means of a line 42a, is directly connected to the connector unit 34 inside which a preliminary dilution of the quantity of concentrated fluid product with a predetermined quantity of hot water is performed. This is performed after simultaneous opening of the valve 43, which supplies the water, and the valve 41, which supplies the quantity of heating steam.

The quantity of concentrated fluid product, for example chocolate product in concentrated form, is then diluted in the connector unit 34 to form a first diluted product, whose quantity and density depend on the dosing of the metering pump 36 that delivers a predetermined quantity of concentrated fluid product and on the quantity of heated water fed into the connector unit 34. The flow rate of the heated water entering the connector unit 34 can be selected by adjusting the calibrated passage of the flow restrictor 44. The first diluted product is then conveyed to the beverage preparation device 17 via the line 37, with the aid, if necessary, of a circulating pump 38.

The quantity of chocolate first diluted product, i.e. prediluted in the connector unit 34 with heated water (e.g. tepid), completes its dilution to achieve the conditions considered optimum for the beverage, in the beverage preparation device 17. Final dilution is achieved by means of introduction into the device 17 of a predetermined quantity of milk via the milk line 26 and a command imparted to the circulating pump 27, obtaining in such a way a second diluted product.

In an embodiment, steam is conveyed to the beverage preparation device 17 through the steam line 19 and a command imparted to the intercept valve 20 for heating the second diluted product to a desired temperature.

Preferably, the beverage preparation device 17 comprises a frothing chamber 17a (FIG. 2) that can be supplied by air through the air line 21. In this way, it is also possible to obtain a chocolate drink also in the frothed condition by imparting a special command to the valve 23 which causes the introduction of a calibrated quantity of air into the device 17 and the consequent frothing of the beverage, i.e. the second diluted product, inside the chamber 17a.

Finally, as illustrated in FIG. 1, the dispenser 18 for the various beverages which may be prepared in the beverage preparation device 17, including the chocolate-based beverage, is arranged preferably close to the coffee dispenser 4 so that, with a single position of the cup 5, it is possible to receive in the cup the various types of beverages which the machine is able to dispense.

From the above description it can be understood that, depending on the opening state of the intercept valves 8, 20, 23 and 43 as well as operation of the pump 27 and the pumps 36 and/or 38, it is possible to dispense various types of beverages, in both the hot and cold state, including, therefore, in addition to the usual coffee, cappuccino and milk, other beverages such as, for example, chocolate, all in the same machine and using procedures which can be performed automatically with the maximum flexibility as regards the type of beverage to be dispensed and at the same time ensuring a high degree of operational reliability.

Although in the above description particular reference has been made to the preparation of a beverage obtained from a chocolate-based fluid product in concentrated form, it is clear that, by way of alternative, a beverage may be obtained from any type of fluid product in concentrated form, having a taste different from chocolate, without thereby departing from the scope of the present invention as described above and claimed below.

The invention claimed is:

1. A machine for preparing various types of coffee and milk based beverages comprising:
   a steam generator for producing steam;
   a first apparatus for producing coffee associated with a first dispenser;
   a source of liquid milk comprising a milk tank containing concentrated milk, and
   a second apparatus for preparing and dispensing a beverage from a concentrated fluid product having a flavor of the beverage to be prepared, wherein said second apparatus includes:
   a concentrated fluid product tank containing the concentrated fluid product to be used for the preparation of the beverage,
   a first connector unit connected to said tank by means of a concentrated fluid line,
   a first metering pump arranged along said concentrated fluid line so as to convey a predetermined quantity of concentrated fluid product from said tank to said first connector unit,
   a second connector unit for dilution of the concentrated fluid product,
   a second metering pump for supplying a predetermined quantity of concentrated milk to said second connector unit,
   a water heater device provided with a first inlet and an outlet for the water and a second inlet for introducing the steam,
   a first water supply line connecting the first inlet of the water heater device to a water source,
   a second water supply line between said second connector unit and the water source,
   a heated water line for connecting the outlet of the heater device with the first connector unit so as to introduce into the latter a predetermined quantity of heated water to pre-dilute the concentrated fluid product,
   a first steam line connecting the steam generator to the second inlet for supplying steam to the heater device,
   a valve operated in response to a command arranged along said second water supply line for supplying a predetermined quantity of cold water to said second connector unit depending on a predetermined quantity of concentrated milk present in the second connector unit so as to form cold diluted milk, and
   a beverage preparation device associated with a second dispenser connected, via a first line, to the first connector unit to receive a concentrated fluid product pre-diluted in the first connector unit and, via a second line, to the source of liquid milk to receive cold diluted milk and complete dilution and obtain a diluted product to be dispensed from the beverage preparation device.

2. The machine according to claim 1, wherein said first water supply line connecting the water source to the first inlet of the water heater device comprises a calibrated flow restrictor.

3. The machine according to claim 1, wherein said beverage preparation device includes a frothing chamber for frothing the product when required and is connected to the steam generator via a second steam line and to an air source via an air line.

4. The machine according to claim 3, further including respective intercept valves arranged along the second steam line and the air line, said intercept valves being able to be operated independently of each other.

5. The machine according to claim 3, further including first and second circulating pumps arranged, respectively, along the second steam line and the air line, the first and second circulating pumps being able to be operated independently of each other.

6. The machine according to claim 1, wherein said second dispenser of the beverage preparation device is positioned close to the first dispenser so that, with a single position of the cup, it is possible to receive in the cup the various types of beverages which the machine is able to dispense.

7. The machine according to claim 1, wherein said source of liquid milk comprises a milk tank containing concentrated milk, a second connector unit for dilution of the concentrated fluid product, a second metering pump for supplying a predetermined quantity of concentrated milk to said second connector unit, a second water supply line between said second connector unit and the water source, a valve arranged along said second water supply line for supplying a predetermined quantity of cold water to the said second connector unit depending on the quantity of concentrated milk present in the second connector unit.

8. The machine according to claim 1, wherein said concentrated fluid product for preparation of the beverage is a chocolate-based product.

9. The apparatus of claim 1, further comprising a second steam line wherein steam is conveyed to the beverage preparation device through the second steam line and a command imparted to an intercept valve provided in the second steam line for heating the diluted product to a desired temperature.

* * * * *